United States Patent
Duque-Antón et al.

(12) 
(10) Patent No.: US 6,888,827 B1
(45) Date of Patent: *May 3, 2005

(54) COMMUNICATIONS SYSTEM WITH SPECIAL CHANNEL

(75) Inventors: Jesus-Manuel Duque-Antón, Aachen (DE); Ralf Günther, Aachen (DE); Thomas Meuser, Aachen (DE); Josef Wasel, Bedburg (DE); Raschid Karabek, Aachen (DE)

(73) Assignee: Koninklijke Philips Electronics N.V., Eindhoven (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 462 days.

(21) Appl. No.: 09/105,857

(22) Filed: Jun. 26, 1998

(30) Foreign Application Priority Data

Jul. 3, 1997 (DE) .......................................... 197 28 505

(51) Int. Cl.[7] .............................................. H04L 12/56

(52) U.S. Cl. ........................................ 370/360; 370/395
(58) Field of Search ................................. 370/395, 392, 370/428, 385, 360

(56) References Cited

U.S. PATENT DOCUMENTS 5,483,527 A * 1/1996 Doshi et al.
5,889,782 A * 3/1999 Dendi

* cited by examiner

Primary Examiner—Kenneth Vanderpuye

(57) ABSTRACT

The invention relates to a communication system which operates in the asynchronous transfer mode (ATM) and which comprises several nodes which form a network and are partly coupled to one another and to terminals, and which each comprise a switch and a control software at least for controlling the relevant coupling field and for the signaling. At least one object of the control software contains detection points in certain states. An object for event handling of the control software is provided for further processing when a detection point is reached. The object for event handling receives data via a special channel from at least one terminal or from another node.

5 Claims, 2 Drawing Sheets

# COMMUNICATIONS SYSTEM WITH SPECIAL CHANNEL

BACKGROUND OF THE INVENTION

The invention relates to a communication system operating in the asynchronous transfer mode (ATM) and having several nodes which form a network and are coupled partly to one another and to terminals, and which each comprise a switch and a control software at least for controlling the relevant switch and for signaling.

Such a communication system is known from the book "ATM, Konzepte-Trends-Migration" ("ATM, Concepts-Trends-Migration") by M. Hein and N. von der Lancken, Internat. Thomson Publ., 1997, Bonn, pp. 97 to 104. This discloses a network with several nodes and with terminals, i.e. end users, connected to certain nodes. Such a terminal may be a telephone, a PC, a workstation, a server, etc. A node comprises a switch with a control software which switches the paths in the coupling field and also serves for signaling, among other purposes.

SUMMARY OF THE INVENTION

The invention has for its object to provide a communication system which renders it possible for certain objects of the control software to have access to information of a terminal or of another node.

According to the invention, this object is achieved in a communication system of the kind mentioned in the opening paragraph in that at least one object of the control software comprises detection points in certain states, one object for event handling of the control software is provided for further processing when a detection point is reached, and the object for event handling is designed for receiving data from at least one terminal or one other node via a special channel.

The nodes of the communication system according to the invention comprise a control software which renders it possible for an object of the control software to have access to a special channel via an object for event handling. The special channel is realized in that cells of a certain cell type transport information for the object for event handling. Information supplied to the object for event handling or originating from the object for event handling are here packed in cells or unpacked from cells in a control device. An object of the control software contains detection points in certain states. When such a detection point is reached, the further processing is taken over by the object for event handling. This object is capable of communicating with terminals or other coupling elements via the special channel. If applicable, received information may then be supplied to the object which has surrendered the control to the object for event handling after reaching of the detection point. It is also possible, for example, to receive aid process information via the special channel while a connection is being built up.

Detection points can be integrated in a particularly simple manner into such objects for signaling which comprise an object which can be represented as a state machine or can be described by a state mode. After the switch of the processing action of a first object via a detection point, the object for event handling is available for receiving information via the special channel and/or for switching over to the first or to a second object.

The invention further relates to a node of a communication system which operates in the asynchronous transfer mode (ATM).

BRIEF DESCRIPTION OF THE DRAWINGS

Embodiments of the invention will now be explained in more detail with reference to the drawings, in which.

DETAILED DESCRIPTION OF THE PREFERRED EMBODIMENTS

Figure 1:
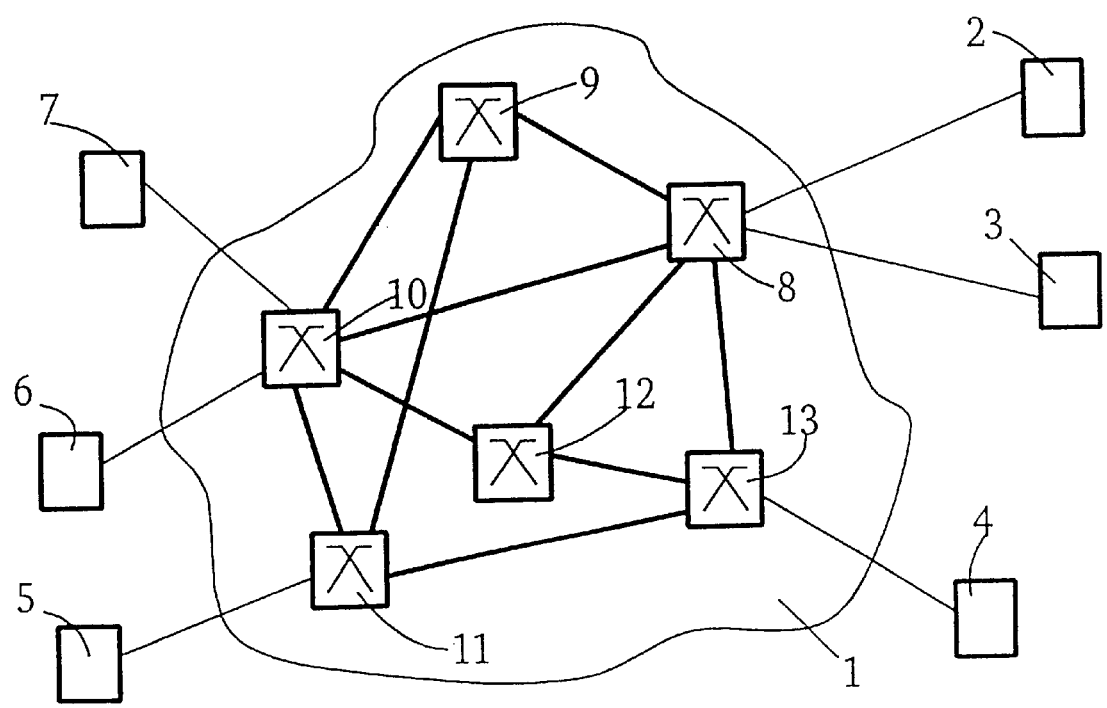
FIG. 1 shows a communication system operating in the asynchronous transfer mode (ATM) with a network comprising several nodes and several terminals.

FIG. 1 shows an embodiment of a communication system operating in the asynchronous transfer mode (ATM) with a network 1 and several terminals or end user stations 2 to 7. The network 1 comprises several nodes 8 to 13 which are connected partly to one another and partly to the terminals 2 to 7. For example, the nodes 8 is connected to the nodes 9, 10, 12, and 13, and to the terminals 2 and 3.

A communication system operating in the asynchronous transfer mode (ATM) is suitable for all services, for example for speech transmission, for the distribution of video signals, and for data communication. The messages or information to be transferred by means of ATM are enveloped in packets of equal length (cells), so that the communication system transmits uniform packets only, independently of the service or application in question. A cell comprises a header of 5 bytes, which contains path and control information, and an information field of 48 bytes, which contains data.

Before the message or information transfer (data transfer), a virtual link is built up by means of signaling and is disconnected again after the data transfer has been completed. An agreement on the desired transmission characteristics, such as bandwidth, failure ate, and running time, is made between the terminal at the user side and the network side.

It is laid down by means of an interface definition how the terminal at the user ide and the network exchange data with one another and how these are processed. The interface between the terminal and the network is referred to as "User to Network Interface", UNI for short. The method Q.2931 standardized by the ITU is used for this. The interface between two coupling elements, or between two networks, is denoted "Network to Network Interface", NNI for short.

Cells referred to as control cells are used for the transmission of the signaling information. After a connection has been made, a virtual channel having been made available for the transmission between two end users, the useful data are transported by means of cells which are called payload cells. The two cell types can be distinguished from one another by certain bits of information in the header of each cell. The two different data—signaling data on the one hand and useful data on the other hand—are passed on or channeled in different manners in a terminal and in a node. Thus an ATM payload channel may be defined for the transport of useful data, and an ATM signaling channel for the transport of signaling data.

A node 8 to 13 comprises a switch which switches a path through the switch in dependence on the path information contained in a cell. A node 8 to 19 also comprises a control device, for example consisting of a microcomputer with control software therein, for the path control and for the signaling. A software architecture of such a control device may be described by means of the software objects diagrammatically depicted in FIG. 2. A first group 14 of objects contains an object 17 (SwSi) for generating and receiving signaling data (switch signaling), an object 18 (EH) for event handling, and an object 19 (CCI) with an interface function (call control interface). A second group 16 of objects comprises an object 20 (CaCo) for controlling the connection (call control), an object 21 (ReCo) for resource control, and an object 22 (CaAd) for call admission control. Messages between the first group 14 and the second group 16 of objects are exchanged via a further object 15 (SCI) with an interface function (switch control interface). The two objects 15 and 19 having an interface function test the validity of incoming messages and commands and translate these into certain, defined messages and commands.

New objects 17 (SwSi), 18 (EH), and 20 (CaCo) are to be created each time for a connection which is to be built up or which has been built up. The objects 15 (SCI), 19 (CCI), 21 (ReCo), and 22 (CaAd) are present only once, independently of the number of connections, and can be called up by other objects.

The object 17 (SwSi) serves to implement the signaling in accordance with the UNI/NNI protocol. After signaling, a payload channel is made available which is characterized by the VPI (virtual path identifier) and VCI (virtual circuit identifier) marks. A VCI provides an indirect addressing for the destination of a cell, and thus a virtual connection. A VPI indicates a set of several virtual links. The object 15 (SCI) converts the signaling data received from SwSi 17 and transmits the converted signaling data to the second group 16 of objects.

The object 20 (CaCo) builds up or disconnects a link after a corresponding command. CaCo 20 addresses the objects 21 (ReCo) and 22 (CaAd) for this purpose. ReCo 21 supplies information on the present status of the network resources. Thus it may be indicated by ReCo 21, for example, whether a link having a bandwidth of 30 Mbit/s is still possible. CaAd 22 decides, after receiving a new request for a connection, whether the connection is accepted or rejected. CaAd 22 accepts a connection when the network has sufficient resources and certain QoS requirements (QoS=Quality of Service) are fulfilled. A path table for the switch of a node also forms part of the object 22 (CaAd). The object 20 (CaCo) comprises in particular a list of all links to be built up, built up, and to be disconnected, with the accompanying information (for example, VPI, VCI). The flow of information between CaCo 20, ReCo 21, and CaAd 22 usually takes place directly between the objects 20, 21, and 22. The data exchange between the first group 14 and the second group 16 is achieved via SCI 15.

The objects 17 (SwSi) and 20 (CaCo) have several states (state machine) which can be described by means of a state model. The object 21 (ReCo) mainly comprises tables, and the object 22 (CaAd) test algorithms. The objects 21 (ReCo) and 22 (CaAd) may be represented as state machines. For example, the object 20 (CaCo) receives a request for connection and switches into a state which triggers various actions. For example, a message is sent to ReCo 21 asking whether a connection with the desired bandwidth is possible. Detection points are inserted for certain states. When a state with a detection point is reached, a message is sent to the object 18 EH, which tests whether a certain action is to be carried out. EH 18 communicates with objects of other nodes or terminals here via the object 19 (CCI). A further cell type is used here for data exchange, called special cell, which thus forms a further channel, called special channel. General information can be accessed via the special channel, for example address information, management information.

Figure 3:
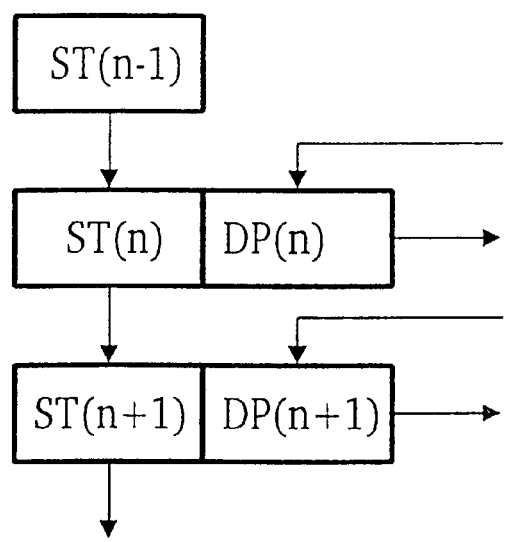
FIG. 3 shows an example of part of a state model of an object of the control software.

FIG. 3 shows an example of part of a state model. An object here changes from one state ST(n−1) via a state ST(n) into a state ST(n+1). A detection point DP(n) belongs to the state ST(n), and a detection point DP(n+1) belongs to the state ST(n+1). When the state ST(n) has been reached, a change is made to the object 18 (EH) via the detection point DP(n), the object 18 then deciding, for example, whether information is to be obtained via the special channel or whether another object must continue with further processing. Information obtained through the special channel is supplied, for example, to the object, and the order is given to continue processing. This is indicated in FIG. 3 by means of an arrow pointing to the detection point DP(n) or DP(n+1).

Detection points DP may be present in the objects 17 (SwSi), 20 (CaCo), 21 (ReCo), and 22 (CaAd), which is indicated in FIG. 3 with the letters DP. It is also possible, however, to provide detection points only in SwSi 17, or in CaCo 20, ReCo 21, and CaAd 22, or in one or several objects of the second group 16.

Various devices in the communication system, for example terminals, comprise objects representing receivers of data from the special channel as part of the control software of their control devices. Such objects can communicate with further objects of the control software and can, for example, call up data from them.

Figure 2:
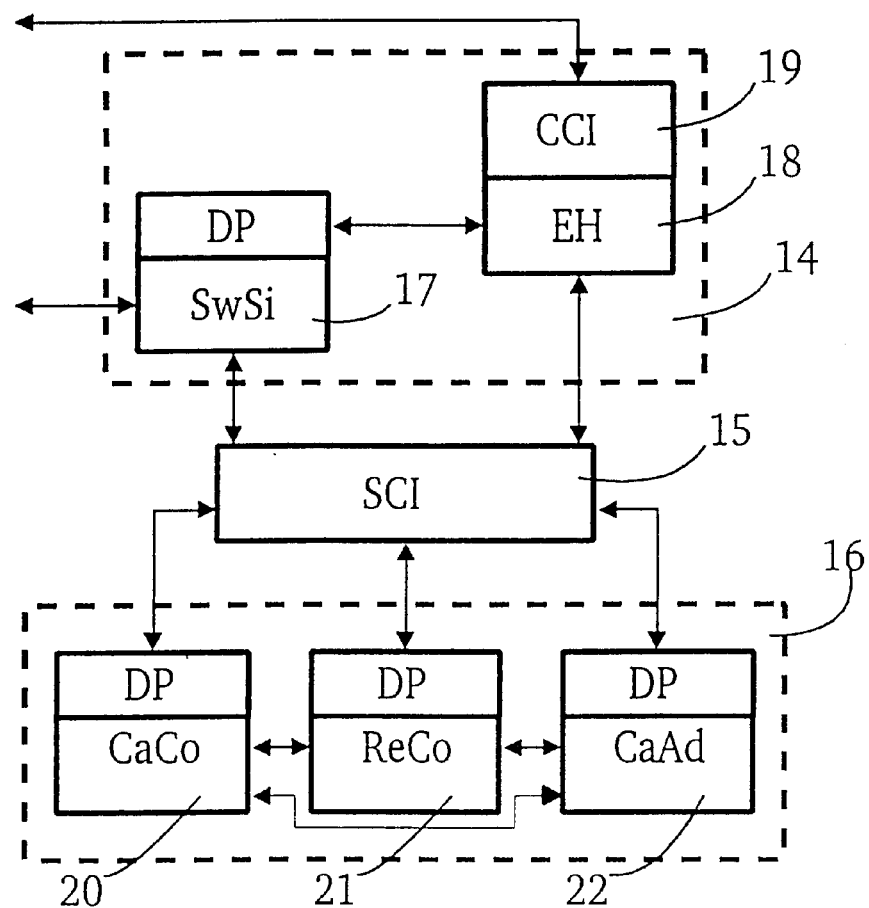
FIG. 2 shows a software architecture of a control software contained in a node.

The method of operation of the object 18 (EH) of FIG. 2 can be explained in more detail with reference to an example. It is assumed here that the terminals 2 to 7 of FIG. 1 are mobile. A user X of the terminal 7 wants to achieve a connection to a user Y of the terminal 2. The terminals 2 to 7 are characterized by means of unequivocal addresses. It is presupposed that the mobile terminal 2 is no longer connected to the node 8, but instead to the node 13. This change in position is put in into a server. After a request for a connection has been received from the user X of the terminal 7, the corresponding objects of the control software of the node 10 are activated. If the object 22 (CaAd) in its search for a path enters a state in which it is tested where the user Y is present, the task of processing is handed over to the corresponding object 18 (EH). The object 18 (EH) sends a request via the special channel to a server which is, for example, the terminal 5, and which controls the addresses and the physical positions of all applications. After the object 18 (EH) has received the message from the terminal 5 that the terminal 2 is linked to the node 13, this information is sent to the object 22 (CaAd), and the control is handed back to CaAd 22 again. The relevant virtual link paths can now be switched.

What is claimed is:

1. A communications system operating in asynchronous transfer mode, comprising:
   a plurality of nodes, wherein selected nodes are connected, each node having a switch and control software for controlling the switch, the control software having a plurality of objects where each object performs a particular function of the control software, including at least one object for event handling;
   a special channel facilitating communications between an object of the control software and each of the nodes and terminals, wherein said communications includes receipt of data by the object for event handling from at least one of said terminal- or said other nodes.

2. The communications system of claim 1, wherein at least one object of the control software, which is responsible for signaling and which can be either represented as or described by a state machine, which comprises detection points in certain states.

3. The communications system of claim 1, wherein the special channel includes the communication of information via a certain cell type.

4. The communications system of claim 1, wherein after the switch-over of the processing of a first object by the control software via a detection point, the object for event handling receives information via the special channel and/or switches over to the processing of the first or of a second object.

5. A node in a communications system operating in the asynchronous transfer mode, which forms a network with several other nodes and is connected to at least one other node, the node comprising:

a switch;

control software at least for controlling the switch, the control software comprising a plurality of objects where each object performs a particular function of the control software, including at least one object for event handling; and a special channel for communications between an object of the control software and selected nodes and/or a terminal, where said communications includes receipt of data by the object for event handling from at least one terminal or: one of the selected nodes.

* * * * *